(12) United States Patent
Sugihara

(10) Patent No.: US 10,674,029 B2
(45) Date of Patent: Jun. 2, 2020

(54) IMAGE FORMING APPARATUS WHICH ADJUSTS ENVIRONMENT CONDITIONS BASED ON TASK DOCUMENT, IMAGE FORMING SYSTEM, AND METHOD FOR CONTROLLING THE IMAGE FORMING APPARATUS

(71) Applicant: KYOCERA Document Solutions Inc., Osaka (JP)

(72) Inventor: Hiroshi Sugihara, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/235,094

(22) Filed: Dec. 28, 2018

(65) Prior Publication Data

US 2019/0238709 A1 Aug. 1, 2019

(30) Foreign Application Priority Data

Jan. 31, 2018 (JP) ................................ 2018-014965

(51) Int. Cl.
| | |
|---|---|
| *H04N 1/00* | (2006.01) |
| *F24F 11/80* | (2018.01) |
| *F24F 11/61* | (2018.01) |
| *E05B 47/00* | (2006.01) |
| *F24F 110/10* | (2018.01) |

(52) U.S. Cl.
CPC ......... *H04N 1/00976* (2013.01); *F24F 11/61* (2018.01); *F24F 11/80* (2018.01); *H04N 1/00204* (2013.01); *E05B 47/0001* (2013.01); *F24F 2110/10* (2018.01); *H04N 1/00978* (2013.01); *H04N 2201/0013* (2013.01); *H04N 2201/0094* (2013.01)

(58) Field of Classification Search
CPC ........... H04N 1/00976; H04N 1/00204; H04N 2201/0013; H04N 2201/0094; F24F 11/61; F24F 11/80; E05B 47/0001
See application file for complete search history.

(56) References Cited

U.S. PATENT DOCUMENTS

| | | | |
|---|---|---|---|
| 2003/0111218 A1 | 6/2003 | Iguchi et al. | 165/200 |
| 2016/0275633 A1* | 9/2016 | Gitt | G06Q 50/06 |
| 2017/0159963 A1* | 6/2017 | Matsugi | F24F 11/74 |
| 2017/0171204 A1* | 6/2017 | Forood | G08B 25/08 |
| 2017/0285944 A1* | 10/2017 | Wang | G06F 3/061 |
| 2018/0089861 A1* | 3/2018 | Klement | G09G 3/2003 |

FOREIGN PATENT DOCUMENTS

JP 2003-186373 A 7/2003

\* cited by examiner

*Primary Examiner* — Juan M Guillermety
(74) *Attorney, Agent, or Firm* — Stein IP, LLC

(57) ABSTRACT

An image forming apparatus includes an acquisition unit, a printing unit that performs a printing job, a communication unit, and a control unit. An installed device is an illumination device. Upon determining that a printing document is a first task document, the control unit controls the communication unit to transmit a first color change instruction. Upon determining that a printing document is a second task document, the control unit controls the communication unit to transmit a second color change instruction. The first color change instruction is an instruction for increasing a color temperature of illumination light. The second color change instruction is an instruction for decreasing a color temperature of illumination light.

17 Claims, 6 Drawing Sheets ated collaboratively with another device. There is
IMAGE FORMING APPARATUS WHICH ADJUSTS ENVIRONMENT CONDITIONS BASED ON TASK DOCUMENT, IMAGE FORMING SYSTEM, AND METHOD FOR CONTROLLING THE IMAGE FORMING APPARATUS This application is based upon and claims the benefit of priority from the corresponding Japanese Patent Application No. 2018-014965 filed on Jan. 31, 2018, the contents of which are incorporated herein by reference.

BACKGROUND

The present disclosure relates to an image forming apparatus and an image forming system that execute a printing job.

Image forming apparatuses such as a multi-functional peripheral, a printer, a copy machine, and a fax machine perform printing. Such an image forming apparatus may be operated collaboratively with another device. There is known one example of a technique for operating an air conditioner and an image forming apparatus collaboratively with each other.

Specifically, there is known an image forming apparatus that, in order to compensate for heat generation resulting from an operation of the self-apparatus, transmits operational information on the self-apparatus to an air conditioner so that the air conditioner can adjust a temperature and/or a humidity in a room in which the self-apparatus is located. This configuration is intended to operate the image forming apparatus and the air conditioner collaboratively with each other so that heat generation is estimated based on the operational information on the image forming apparatus and, based on a result of the estimation, the air conditioner adjusts a temperature and a humidity in the room.

Typically, an office environment (an interior condition) is consistent. A user sets a temperature for an air conditioner. The air conditioner cools or heats air in a room so as to attain the temperature thus set. When wishing to change a temperature in the room, the user manually changes the set temperature. Furthermore, a color and brightness of illumination depend on a color and output wattage of a lamp, respectively.

Herein, it is known that business efficiency (a processing speed, a progress speed) may be improved by changing an office environment depending on contents of a task (a job). On the other hand, depending on how the environment is changed, business efficiency might be degraded due to a reason that it is hard to concentrate in the environment thus changed. In changing an office environment, there is a problem that the environment should be adapted to a task about to be performed. The environment should be changed so as to enable individuals to fulfill their skills and qualities to a higher extent.

In the above-mentioned known technique, when a printing amount of an image forming apparatus is large, an air conditioner is operated so as to prevent a temperature in the room from increasing due to heat generated from the image forming apparatus. That is, a temperature in a room is kept constant so that an environment is actively maintained. Consequently, the known technique cannot solve the above-described problem.

SUMMARY

An image forming apparatus according to the present disclosure includes an acquisition unit, a printing unit, a communication unit, and a control unit. The acquisition unit acquires data to be used for printing. Based on the data acquired by the acquisition unit, the printing unit performs a printing job. The communication unit performs communication. Based on contents of the printing job, the control unit determines whether a printing document that is a document to be printed in the printing job is a first task document or a second task document. Based on a result of the determination, the control unit controls the communication unit to transmit an instruction for controlling an operation of an installed device that is stationarily installed in a room. The installed device is an illumination device. Upon determining that the printing document is the first task document, the control unit controls the communication unit to transmit a first color change instruction. Upon determining that the printing document is the second task document, the control unit controls the communication unit to transmit a second color change instruction. The first color change instruction is an instruction for increasing a color temperature of illumination light. The second color change instruction is an instruction for decreasing a color temperature of illumination light.

Furthermore, an image forming system according to the present disclosure includes the above-mentioned image forming apparatus and an illumination device that includes a first light source and a second light source having a color temperature lower than that of the first light source. The first color change instruction is an instruction to turn on the first light source. The second color change instruction is an instruction to turn on the second light source. Upon receiving the first color change instruction in a state where the first light source is on, the illumination device increases a light quantity of the first light source. Upon receiving the second color change instruction in a state where the second light source is on, the illumination device decreases a light quantity of the second light source.

Further features and advantages of the present disclosure will be made more apparent from an embodiment given below.

DETAILED DESCRIPTION

The present disclosure is intended to change an office environment so as to improve efficiency of a task about to be performed. With reference to FIG. 1 to FIG. 9, the following describes an image forming apparatus according to the present disclosure. The description uses a multi-functional peripheral 100 as an example of the image forming apparatus. The multi-functional peripheral 100 serves also as an image forming apparatus. It is to be noted, however, that various elements such as configurations and arrangements described in this embodiment are merely illustrative examples and not intended to limit the scope of the disclosure.

(Multi-Functional Peripheral 100)

Figure 1:
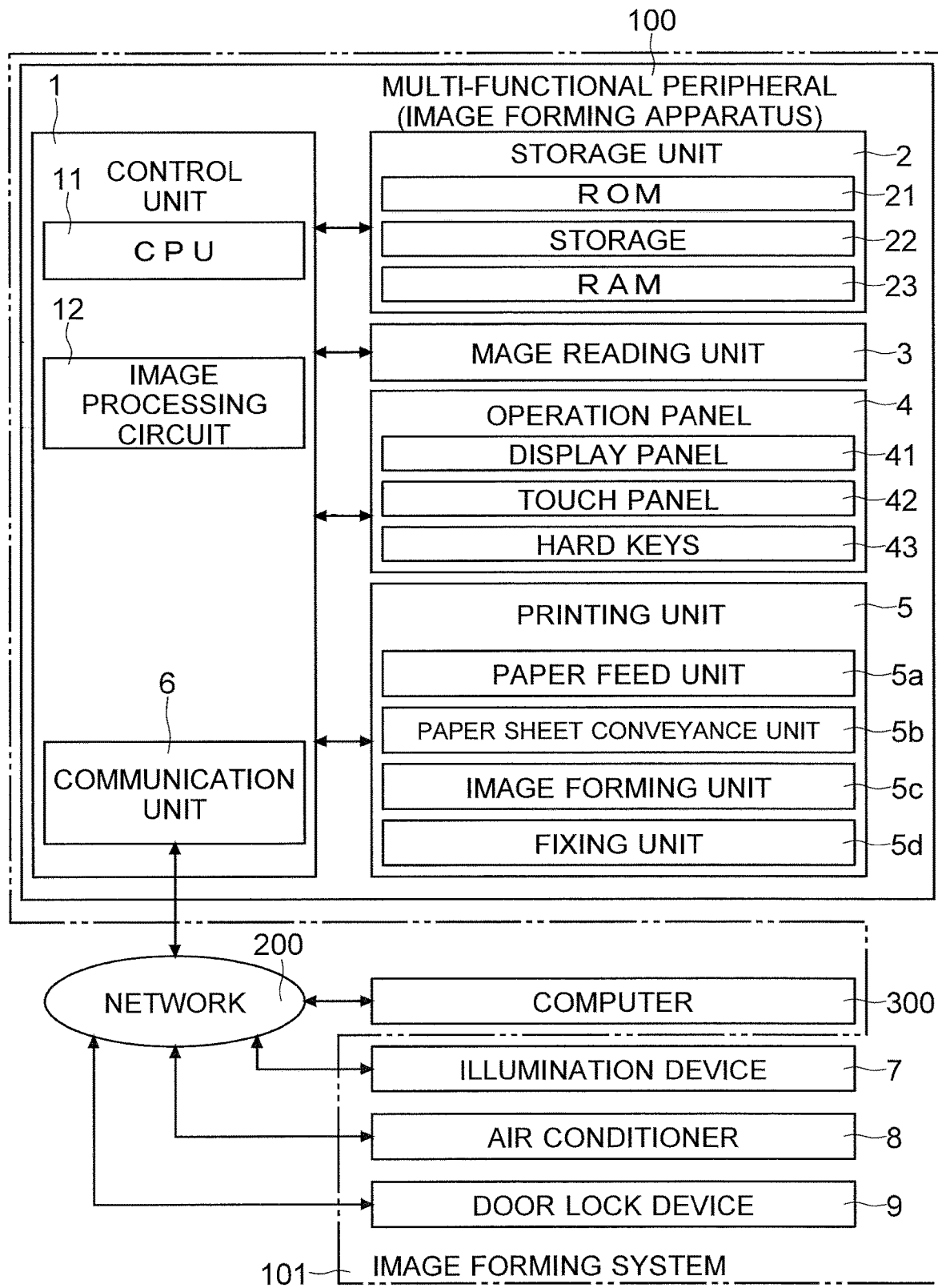
FIG. 1 is a diagram showing one example of a multi-functional peripheral according to an embodiment.

Based on FIG. 1, a description is given of one example of the multi-functional peripheral 100 according to an embodiment. The multi-functional peripheral 100 includes a control unit 1, a storage unit 2, an image reading unit 3 (corresponding to an acquisition unit), an operation panel 4, a printing unit 5, and a communication unit 6 (corresponding to the acquisition unit).

The control unit 1 controls various portion of the multi-functional peripheral 100. The control unit 1 includes a CPU 11 and an image processing circuit 12. The CPU 11 performs computation and control. The image processing circuit 12 performs image processing with respect to image data. The image processing circuit 12 generates image data to be used for printing. The storage unit 2 includes a non-volatile storage device and a volatile storage device. As the non-volatile storage device, the storage unit 2 includes a ROM 21 and a storage 22 (an HDD or an SSD). As the volatile storage device, the storage unit 2 includes a RAM 23. The storage unit 2 stores control programs and data.

In a printing job (a copy job) in which an original document is read, the control unit 1 controls the image reading unit 3 to read the original document. The image reading unit 3 generates image data.

The control unit 1 is communicably connected to the operation panel 4. The operation panel 4 includes a display panel 41, a touch panel 42, and hard keys 43. The control unit 1 controls display on the display panel 41. The control unit 1 controls the display panel 41 to display operation images used for setting. The operation images are, for example, soft keys and buttons. Based on an output of the touch panel 42, the control unit 1 recognizes an operated one(s) of the operation images. The control unit 1 also recognizes an operated one(s) of the hard keys 43. The operation panel 4 accepts an operation (an operation with respect to any of the operation images or any of the hard keys 43) performed by a user.

While conveying a paper sheet, the printing unit 5 performs printing on the paper sheet. Based on image data, the printing unit 5 performs the printing. The printing unit 5 includes a paper feed unit 5a, a paper sheet conveyance unit 5b, an image forming unit 5c, and a fixing unit 5d. The control unit 1 controls respective operations of the paper feed unit 5a, the paper sheet conveyance unit 5b, the image forming unit 5c, and the fixing unit 5d. In a printing job, the control unit 1 controls the paper feed unit 5a to feed a paper sheet. The control unit 1 controls the paper sheet conveyance unit 5b to convey the paper sheet. The control unit 1 controls the image forming unit 5c to form a toner image based on image data. The control unit 1 controls the image forming unit 5c to transfer the toner image thus formed on the paper sheet conveyed to the image forming unit 5c. The control unit 1 controls the fixing unit 5d to apply heat and pressure to the paper sheet on which the toner image has thus been transferred. Thus, the toner image is fixed on the paper sheet. The control unit 1 control the paper sheet conveyance unit 5b to convey the paper sheet that has thus been subjected to fixing (subjected to printing) to a discharge tray.

The communication unit 6 is capable of communication via a network 200. The communication unit 6 includes hardware and software necessary for communication. The hardware is, for example, a communication circuit and a communication memory. The communication unit 6 communicates with a computer 300. The computer 300 is, for example, a personal computer or a server. The communication unit 6 is communicable with a plurality of computers 300.

The multi-functional peripheral 100 performs a printing job. The printing job includes, for example, a copy job and a print job. In the copy job, the image reading unit 3 reads an original document. The image reading unit 3 processes image data obtained through the reading. The control unit 1 controls the printing unit 5 to perform printing based on the image data. In the copy job, the image reading unit 3 functions as the acquisition unit. The print job is performed when the communication unit 6 has received print job data from the computer 300. Based on the print job data, the image processing circuit 12 generates and processes image data. The control unit 1 controls the printing unit 5 to perform printing based on the image data. In the print job, the communication unit 6 functions as the acquisition unit. Based on data acquired by the acquisition unit, the printing unit 5 performs printing.

Figure 2:
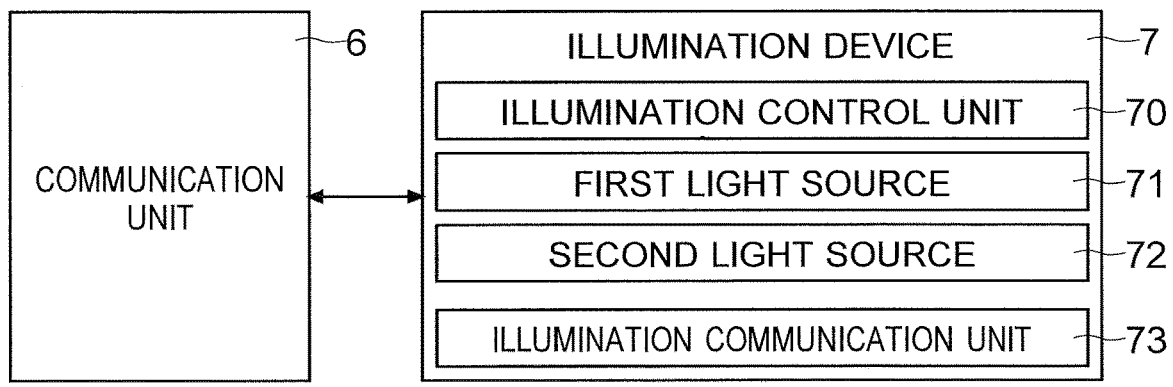
FIG. 2 is a diagram showing one example of an illumination device based on the multi-functional peripheral according to the embodiment.

Furthermore, via the network 200, the communication unit 6 is communicable with an illumination device (corresponding to an installed device), an air conditioner 8 (corresponding to the installed device), and a door lock device 9 (corresponding to the installed device). The network 200 is, for example, the Internet. The illumination device 7, the air conditioner 8, and the door lock device 9 are each an IoT device. For example, the illustration device 7 is mounted to a ceiling in a room. The illumination device 7 illuminates an inside of the room. For example, the air conditioner 8 is mounted to a ceiling or a wall in a room. The air conditioner 8 adjusts a temperature in the room. The door lock device 9 locks or unlocks a door for entering or exiting from a room. There may be provided one or a plurality of illumination devices 7. There may also be provided one or a plurality of air conditioners 8. There may further be provided one or a plurality of door lock devices 9. For the sake of convenience, FIG. 2 shows one illumination device 7, one air conditioner 8, and one door lock device 9. The multi-functional peripheral 100, the illumination device 7, the air conditioner 8, and the door lock device 9 constitute an image forming system 101 (an environment management system).

(Control of Illumination Device 7)

Next, with reference to FIG. 2, a description is given of one example of control of the illumination device 7 based on the multi-functional peripheral 100 according to the embodiment. The illumination device 7 includes an illumination control unit 70, a first light source 71, a second light source 72, and an illumination communication unit 73. For example, the first light source 71 and the second light source 72 are LEDs. In other words, the illumination device 7 is an LED lamp. The first light source 71 and the second light source 72 are different from each other in color temperature.

The first light source 71 has a color temperature higher than that of the second light source 72. The second light source 72 has a color temperature lower than that of the first light source 71. For example, the first light source 71 has a color temperature of about 5000 K to about 6500 K (natural white color or daylight color). The second light source 72 has a color temperature of about 3000 K (incandescent color).

The illumination control unit 70 is a substrate including a circuit that controls the illumination device 7. The illumination control unit 70 controls the first light source 71. For example, the illumination control unit 70 controls illuminance (a light quantity) of the first light source 71. The illumination control unit 70 also controls the second light source 72. For example, the illumination control unit 70 controls illuminance (a light quantity) of the second light source 72. The illumination communication unit 73 receives an instruction from a multi-functional peripheral 100 (the communication unit 6). Based on the instruction from the multi-functional peripheral 100, the illumination control unit 70 selects one of the first light source 71 and the second light source 72 as a light source to be turned on. When the first light source 71 is on, the illumination control unit 70 turns off the second light source 72. Furthermore, when the second light source 72 is on, the illumination control unit 70 turns off the first light source 71. Based on the instruction from the multi-functional peripheral 100, the illumination control unit 70 adjusts a light quantity (illuminance). For example, the illumination control unit 70 adjusts a light quantity by changing a magnitude of an electric current to be passed through each of the first light source 71 and the second light source 72.

(Control of Air Conditioner 8)

Figure 3:
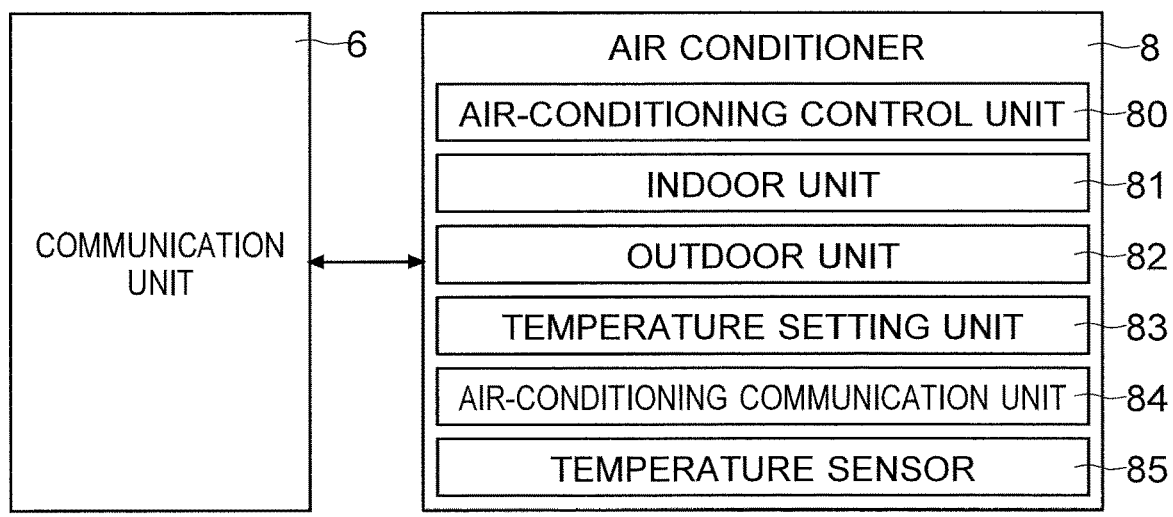
FIG. 3 is a diagram showing one example of an air conditioner based on the multi-functional peripheral according to the embodiment.

Next, with reference to FIG. 3, a description is given of one example of control of the air conditioner 8 based on the multi-functional peripheral 100 according to the embodiment. The air conditioner 8 includes air-conditioning control unit 80, an indoor unit 81, an outdoor unit 82, a temperature setting unit 83, and an air-conditioning communication unit 84. The indoor unit 81 includes a fan. The indoor unit 81 inhales air in a room. The indoor unit 81 blows out heat-exchanged air into the room. The outdoor unit 82 and the indoor unit 81 exchange a refrigerant therebetween. The outdoor unit 82 includes a heat exchanger. The outdoor unit 82 performs heat exchange with air outside the room (air outside a building). As a result of the heat exchange, cool air or hot air is blown out from the indoor unit 81. The temperature setting unit 83 accepts setting of a set temperature, an air volume, an air direction, a mode, and so on of the air conditioner 8. The temperature setting unit 83 may be in the form of a panel provided on a wall surface or a remote controller.

The air-conditioning control unit 80 is a substrate including a circuit that controls the air conditioner 8. Furthermore, the air conditioner 8 includes a temperature sensor 85. Based on an output of the temperature sensor 85, the air-conditioning control unit 80 recognizes a temperature in a room. The air-conditioning control unit 80 controls a volume of cool air or hot air so that a temperature in the room attains a set temperature (a temperature set in the temperature setting unit 83). In other words, air-conditioning control unit 80 controls respective operations of the outdoor unit 82 and the indoor unit 81 so that a temperature detected by the temperature sensor 85 is the set temperature. Thus, a temperature in the room is maintained at the set temperature.

The air-conditioning communication unit 84 receives an instruction from the multi-functional peripheral 100 (the communication unit 6). Based on the instruction from the multi-functional peripheral 100, the air-conditioning control unit 80 changes a set temperature. Upon receiving the instruction, the air-conditioning control unit 80 automatically changes the set temperature.

(Control of Door Lock Device 9)

Figure 4:
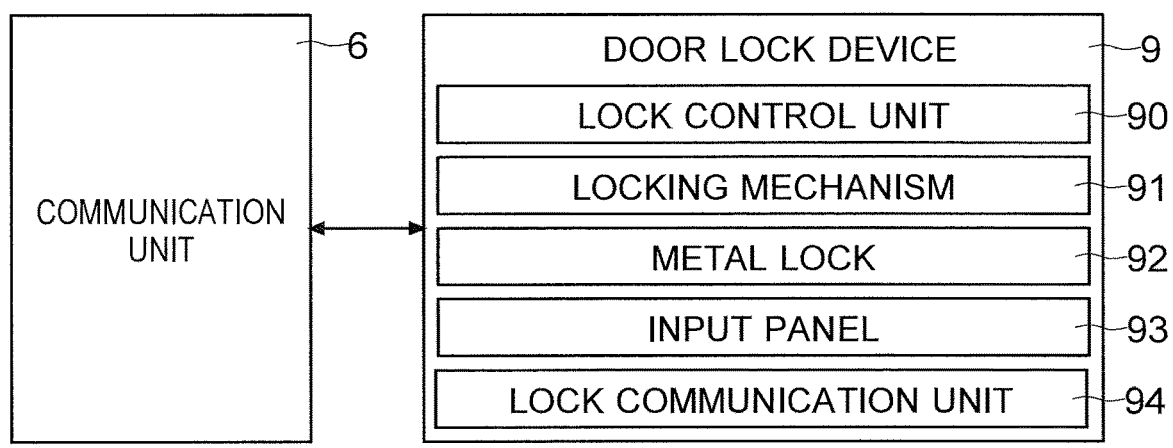
FIG. 4 is a diagram showing one example of a door lock device based on the multi-functional peripheral according to the embodiment.

Next, with reference to FIG. 4, a description is given of one example of control of the door lock device 9 based on the multi-functional peripheral 100 according to the embodiment. The door lock device 9 includes a lock control unit 90, a locking mechanism 91, a metal lock 92, an input panel 93, and a lock communication unit 94. The locking mechanism 91 and the metal lock 92 are provided at a door. The locking mechanism 91 includes a motor and gears. The locking mechanism 91 actuates the metal lock 92. The lock control unit 90 controls locking and unlocking of the door. The lock control unit 90 is a substrate including a circuit that controls the door lock device 9. In performing locking, the lock control unit 90 operates the locking mechanism 91. The lock control unit 90 actuates the metal lock 92 in such a direction as to achieve locking. In a locked state, the door cannot be opened. In performing unlocking, the lock control unit 90 operates the locking mechanism 91. The lock control unit 90 actuates the metal lock 92 in such a direction as to achieve unlocking. In an unlocked state, the door can be opened.

The input panel 93 is a section for temporarily cancelling a locked state. The input panel 93 is provided in a vicinity of the door. The input panel 93 accepts an input of an unlocking number. The input panel 93 may be of a type that accepts an unlocking number directly inputted by a person trying to enter a room or a type that reads an unlocking card.

In a case where the input panel 93 is of the type that accepts a directly inputted unlocking number, the input panel 93 includes buttons for inputting numbers. A person wishing to perform unlocking inputs an unlocking number by operating the buttons. In a case where the input panel 93 is of the type that reads an unlocking card, the input panel 93 includes a card reader. The input panel 93 reads an unlocking number from the unlocking card being held thereover. The lock control unit 90 recognizes the unlocking number thus inputted. The lock control unit 90 compares the unlocking number with a pre-registered number. The lock control unit 90 determines whether or not the unlocking number is correct. When the inputted unlocking number is correct, the lock control unit 90 temporarily unlock the metal lock 92. When a preset length of time has elapsed after the temporary unlocking, the lock control unit 90 brings the metal lock 92 back to a locked state. The lock communication unit 94 receives an instruction from the multi-functional peripheral 100 (the communication unit 6). Based on the instruction from the multi-functional peripheral 100, the lock control unit 90 performs locking or unlocking.

(Determination of Contents of Document)

Figure 5:
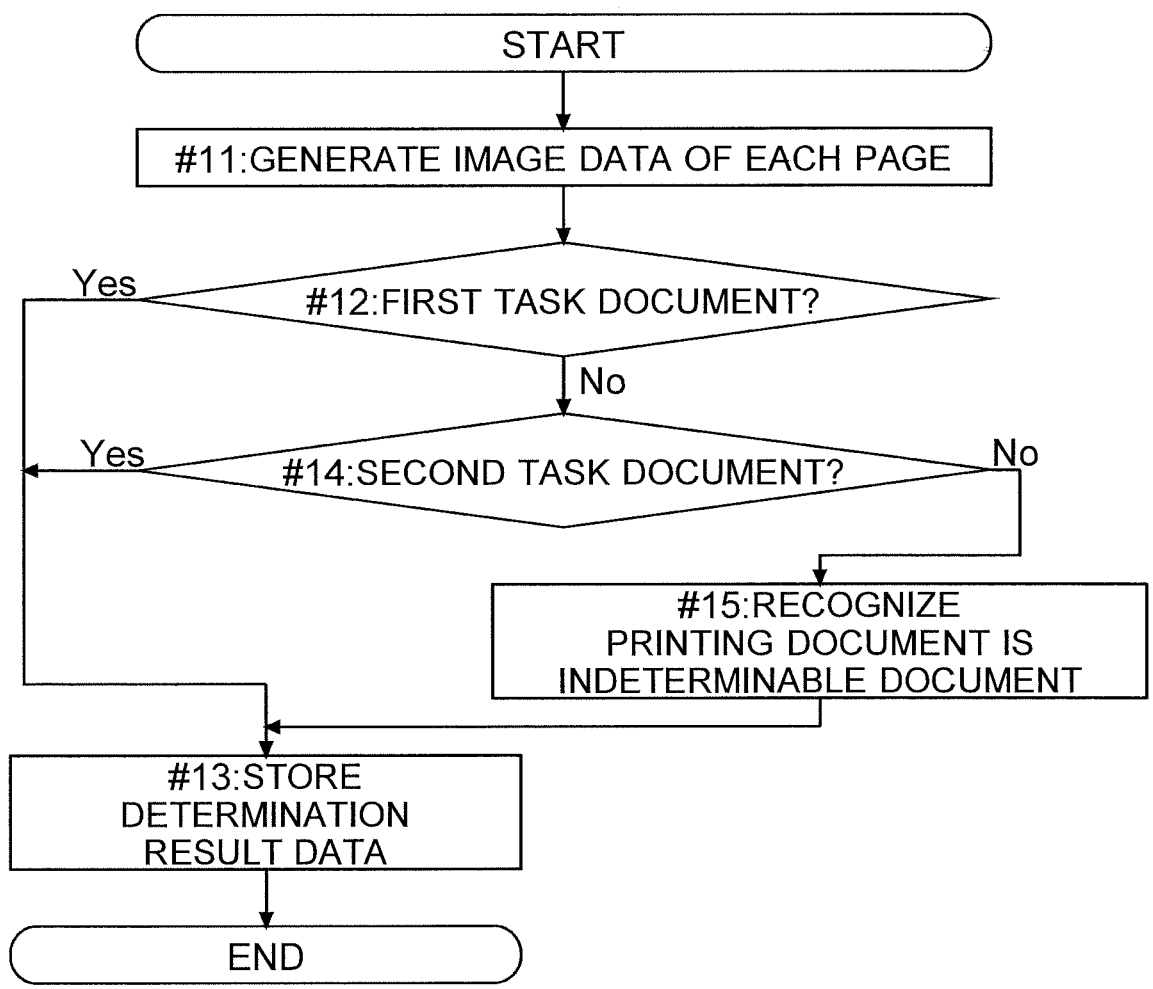
FIG. 5 is a diagram showing one example of a flow of determination of contents of a document performed in the multi-functional peripheral according to the embodiment.

Next, with reference to FIG. 5, a description is given of one example of determination of contents of a document performed in the multi-functional peripheral 100 according to the embodiment. In FIG. 5, "START" refers to a point in time when a printing job is started. The printing job is, for example, a copy job or a print job. First, the control unit 1 (the image processing circuit 12) generates image data of each page to be printed in the printing job (Step #11).

The control unit 1 determines whether or not a document (a printing document) to be printed in the printing job is a first task document (Step #12). In order to determine whether or not the document is the first task document, the control unit 1 (the image processing circuit 12) analyzes the image data of each page to be printed in the printing job. The first task document is a document used in a task that is preferably performed in a brain-awakened state. In other words, the first task document is a document used in a task that is preferably performed in an awakened state. For example, the first task document is a document used in a task such as examining contents of the document, discovering errors in the document, or performing a calculation. In performing a task of checking sentences or numerals or a task of performing a calculation, preferably, there is established an interior environment that is unlikely to cause drowsiness.

For example, a configuration may be adopted in which when a printing document contains a table larger than a prescribed size, the control unit 1 determines that the printing document is the first task document. For example, financial documents contain tables. In order to check whether or not a printing document contains a table larger than the prescribed size, the control unit 1 analyzes image data of each page thereof. For example, the control unit 1 checks a ruled line contained in each page. The control unit 1 recognizes, as a ruled line, a straight line made up of high-density pixels and having a length equal to or longer than a prescribed length. Further, the control unit 1 may determine that a printing document containing a region enclosed by four ruled lines, which includes a plurality of ruled lines therein and having a size larger than a prescribed size, is the first task document.

Furthermore, a configuration may be adopted in which when a printing document is a fixed form document conforming to a preset format, the control unit 1 determines that the printing document is the first task document. In creating a fixed form document or examining contents thereof, preferably, there is established an interior environment that is unlikely to cause drowsiness. In order to check whether or not a printing document is a fixed form document, the control unit 1 (the image processing circuit 12) analyzes image data of each page to be printed in a printing job. For example, the control unit 1 performs OCR processing so as to recognize characters and words contained in each page. The storage unit 2 stores word data obtained by compiling words contained in various fixed form documents. A configuration may be adopted in which when the number of matched pairs each composed of a word included in a printing job and a word included in the word data exceeds a prescribed value, the control unit 1 determines that a printing document is a fixed form document.

Furthermore, a configuration may be adopted in which when a printing document is a document used for a calculation, the control unit 1 determines that the printing document is the first task document. In order to check whether or not a printing document is a document used for a calculation, the control unit 1 may perform OCR processing so as to recognize the number of numerals contained in each page. A configuration may be adopted in which when the number of numerals contained in a printing document exceeds a prescribed number, the control unit 1 determines that the printing document is a document used for a calculation.

The above-mentioned technique for determining whether or not a printing document is the first task document is one example. Other techniques may also be used to determine whether or not a printing document is the first task document. For example, the control unit 1 may use a deep learning technique to determine whether or not a printing document is the first task document. In this case, the storage unit 2 stores first determination data (big data) for determining whether or not a printing document is the first task document. For example, the storage 22 stores the first determination data.

Upon determining that the printing document is the first task document ("Yes" at Step #12), the control unit 1 controls the storage unit 2 to store determination result data in a non-volatile manner (Step #13). The determination result data is data including a result of the determination accompanied by a date and time of the determination. Then, this determination process is ended ("END"). Upon determining that the printing document is not the first task document ("No" at Step #12), the control unit 1 determines whether or not the printing document is a second task document (Step #14).

In order to determine whether or not the printing document is the second task document, the control unit 1 (the image processing circuit 12) analyzes the image data of each page to be printed in the printing job. The second task document is a document used in a task that is preferably performed in a state where abundant creativity occurs. In other words, the second task document is a document used in a task that is preferably performed in a relaxed state where ideas are likely to occur. For example, the second task document is a written proposal, a presentation document, or a document used in brainstorming. When a task based on the second task document is performed, preferably, there is established an environment in which ideas are likely to occur.

For example, a configuration may be adopted in which when a printing document is a written proposal, the control unit 1 determines that the printing document is the second task document. In order to determine whether or not the printing document is the second task document, the control unit 1 analyzes the image data of each page to be printed in the printing job. In order to attract interest, various visual ingenuity is used to create a written proposal. From this viewpoint, a configuration may be adopted in which when the number of character colors used in a printing document is equal to or larger than a preset number of colors, the control unit 1 determines that the printing document is a written proposal. Furthermore, the control unit 1 recognizes a size of each character contained in each page to be printed in the printing job. A configuration may be adopted in which when the number of types of character sizes used in a printing document is equal to or larger than a preset number of types, the control unit 1 determines that the printing document is a written proposal.

Furthermore, when a printing document is a presentation document, the control unit 1 determines that the printing document is the second task document. When print job data received by the communication unit 6 is based on a file created using presentation document creation software, the control unit 1 determines that a printing document is a presentation document. The presentation document creation software is, for example, Power Point.

The above-mentioned technique for determining whether or not a printing document is the second task document is one example. Other techniques may also be used to determine whether or not a printing document is the second task document. For example, the control unit 1 may use the deep learning technique to determine whether or not a printing document is the second task document. In this case, the storage unit 2 stores second determination data (big data) for determining whether or not a printing document is the second task document. For example, the storage 22 stores the second determination data.

Upon determining that the printing document is the second task document ("Yes" at Step #14), the flow makes a transition to Step #13. Upon determining that the printing document is not the second task document ("No" at Step

14), the control unit 1 recognizes that the printing document is a document (an indeterminable document) that is not the first task document nor the second task document (Step #15). Then, the flow makes a transition to Step #13 ("END").

(Control of Illumination Device 7)

Figure 6:
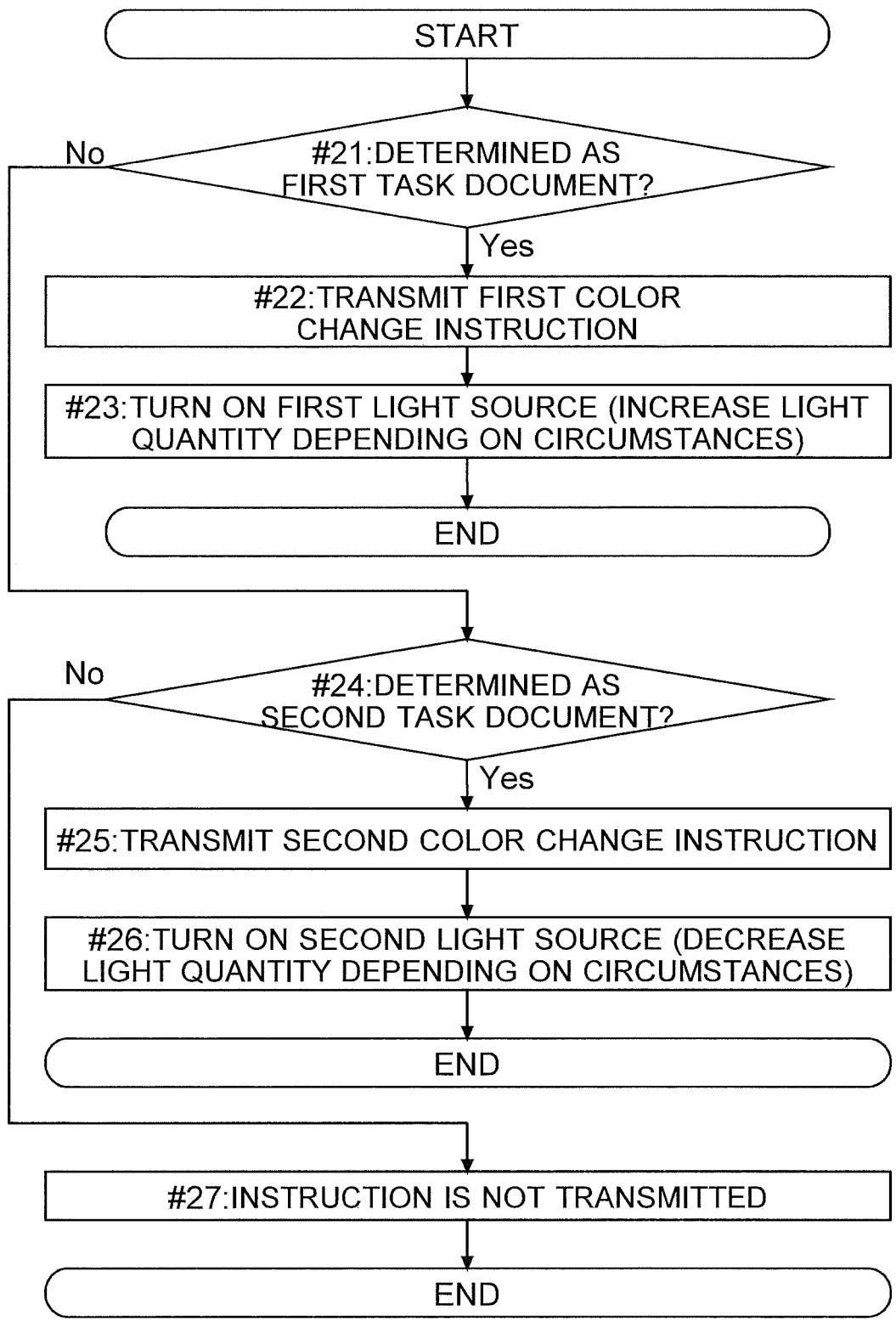
FIG. 6 is a diagram showing one example of a flow of control of the illumination device based on the multi-functional peripheral according to the embodiment.

Next, with reference to FIG. 6, a description is given of one example of a flow of control of the illumination device 7 based on the multi-functional peripheral 100 according to the embodiment. In FIG. 6, "START" refers to a point in time when determination of a printing document is performed. A flow chart in FIG. 6 may be implemented every time the determination is performed. However, frequently switching an illumination state in a room might interfere with concentration. To avoid this, a configuration may be adopted in which after an instruction is issued to the illumination device 7 based on the flow chart in FIG. 6, until a preset first wait time has elapsed, the flow chart in FIG. 6 is not implemented even when a printing job is implemented. In other words, a configuration may be adopted in which until the first wait time has elapsed after transmission of the instruction to the illumination device 7, the control unit 1 does not transmit a next instruction to the illumination device 7.

This can prevent an illumination state in a room from being frequently switched. The storage unit 2 stores the first wait time in a non-volatile manner. The first wait time is set beforehand. The operation panel 4 may accept setting of the first wait time. In this case, the storage unit 2 stores a thus-set value of the first wait time. The control unit 1 transmits an instruction to the illumination device 7 after a pause of a length of time equal to or longer than the thus-set value of the first wait time.

Upon determining that a printing document is the first task document ("Yes" at Step #21), the control unit 1 controls the communication unit 6 to transmit a first color change instruction toward the illumination device 7 (the illumination communication unit 73) (Step #22). The first color change instruction is an instruction for increasing a color temperature of illumination light.

Upon receiving the first color change instruction, the illumination control unit 70 turns on the first light source 71 (Step #23). In a case where, before receipt of the first color change instruction, the second light source 72 had been on and the first light source 71 had been off, the illumination control unit 70 turns on the first light source 71 and turns off the second light source 72. In a case where, since before receipt of the first color change instruction, the first light source 71 has been on and the second light source 72 has been off, the illumination control unit 70 performs control so that the first light source 71 continues to be on and the second light source 72 continued to be off.

While the first light source 71 is on, the illumination control unit 70 performs control so that the first light source 71 is on, providing illuminance in a room falling within a preset illuminance range. For example, a certain country's standards specify that a preferred illuminance in an office is about 300 lux to 750 lux. Based on this, the illuminance range can be set to 300 lux to 750 lux.

The first light source 71 has a color temperature higher than that of the second light source 72. Light of the first light source 71 is perceived to be whiter and brighter than light of the second light source 72. Light of the first light source 71 has a stronger brain-awakening effect than that of light of the second light source 72. Light of the first light source 71 is more unlikely to cause drowsiness. The first task document is a document used in a task that is preferably performed in an awakened state, such as routine work. Thus, it is possible to adjust a color of illumination light so as to enhance efficiency of a task using the first task document.

A configuration may be adopted in which in a case where, since before receipt of the first color change instruction, the first light source 71 has been on and the second light source 72 has been off, upon receiving the first color change instruction, the illumination control unit 70 gradually increases a light quantity of the first light source 71. That is, depending on circumstances, the illumination control unit 70 may increase a light quantity of the first light source 71 (Step #23). The control unit 1 ends this flow ("END").

Specifically, the illumination control unit 70 gradually increases an electric current that is supplied to the first light source 71. An upper limit value of an electric current that is supplied to the first light source 71 (an upper limit light quantity) is set beforehand. This is because excessive brightness causes an increased sense of unpleasantness. Upon receiving the first color change instruction in a state where an electric current has the upper limit value (the upper limit light quantity), the illumination control unit 70 does not increase a light quantity of the first light source 71.

Upon determining that the printing document is not the first task document ("No" at Step #21) and determining that the printing document is the second task document ("Yes" at Step #24), the control unit 1 controls the communication unit 6 to transmit a second color change instruction toward the illumination device 7 (the illumination communication unit 73) (Step #25). The second color change instruction is an instruction for decreasing a color temperature of illumination light.

Upon receiving the second color change instruction, the illumination control unit 70 turns on the second light source 72 (Step #26). In a case where, before receipt of the second color change instruction, the first light source 71 had been on and the second light source 72 had been off, the illumination control unit 70 turns on the second light source 72 and turns off the first light source 71. On the other hand, in a case where, since before receipt of the second color change instruction, the second light source 72 has been on and the first light source 71 has been off, the illumination control unit 70 performs control so that the second light source 72 continues to be on and the first light source 71 continues to be off. The illumination control unit 70 performs control so that the second light source 72 is on, providing illuminance in a room falling within the above-mentioned illuminance range.

The second light source 72 has a color temperature lower than that of the first light source 71. Light of the second light source 72 contains a large amount of orange color component. Light of the second light source 72 is perceived to be less white and a bit darker than light of the first light source 71. It is said that light of the second light source 72 has a stronger effect of enhancing creativity (inspiration) than that of light of the first light source 71. Light of the second light source 72 is more suited to a creative task. The second task document is a document used in a task that is preferably performed in a state where abundant creativity occurs, such as creating a written proposal. It is possible to adjust a color of illumination light so as to enhance efficiency of a task using the second task document.

A configuration may be adopted in which in a case where, since before receipt of the second color change instruction, the second light source 72 has been on and the first light source 71 has been off, the illumination control unit 70 gradually decreases a light quantity of the second light source 72 every time it receives the second color change instruction. That is, depending on circumstances, the illumination control unit 70 may decrease a light quantity of the second light source (Step #26). Then, the control unit 1 ends this flow ("END").

Specifically, every time the illumination control unit 70 receives the second color change instruction, the illumination control unit 70 gradually decreases an electric current that is supplied to the second light source 72. A lower limit value (a lower limit light quantity) of an electric current that is supplied to the second light source 72 is preset. This is because excessive darkness is not preferable. Upon receiving the second color change instruction in a state where an electric current has the lower limit value (the lower limit light quantity), the illumination control unit 70 does not decrease a light quantity of the second light source 72.

Upon determining that the printing document is not the first task document ("No" at Step #21) and determining that the printing document is not the second task document ("No" at Step #24), either, the control unit 1 does not transmit an instruction to the illumination device 7 (the illumination communication unit 73 (Step #27). That is, the control unit 1 does not change a color of light that is emitted by the illumination device 7. Furthermore, the control unit 1 does not change a light quantity of the illumination device 7, either. Then, this flow is ended ("END").

(Control of Air Conditioner 8)

Figure 7:
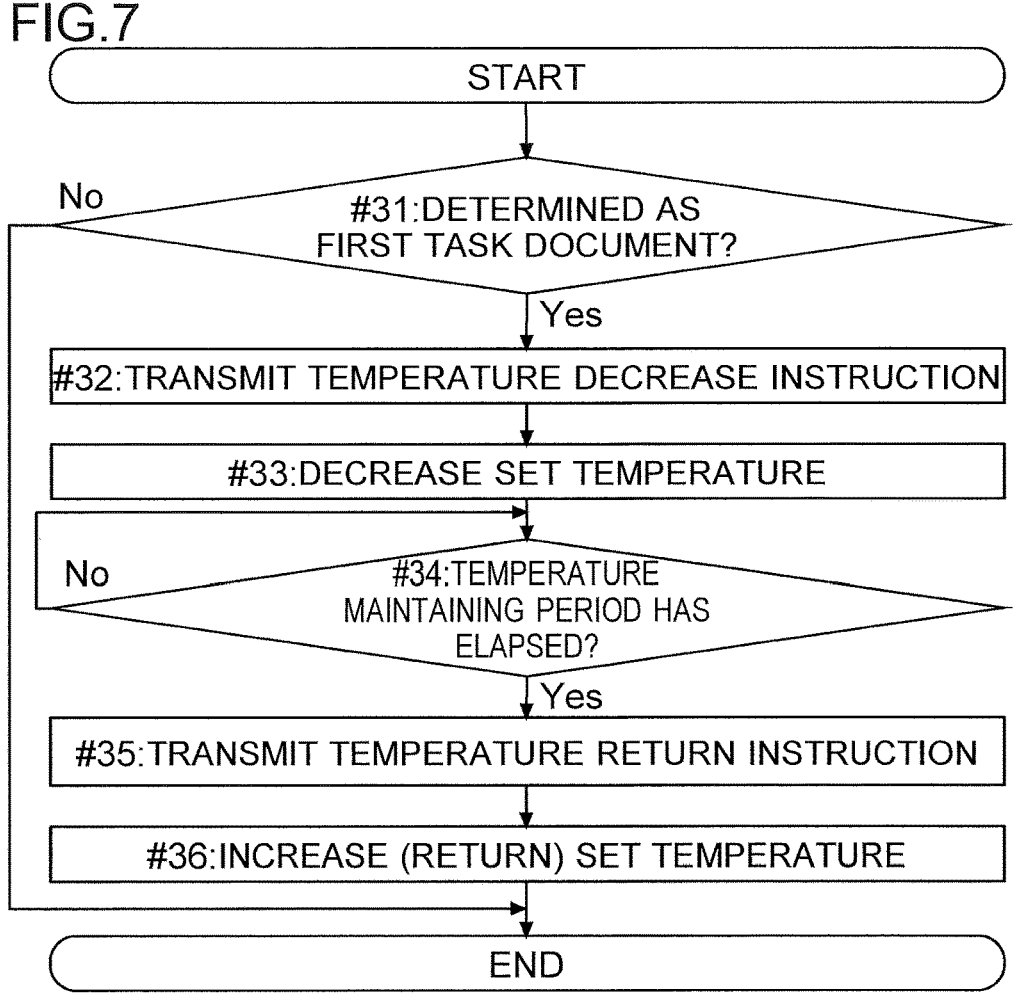
FIG. 7 is a diagram showing one example of a flow of control of the air conditioner based on the multi-functional peripheral according to the embodiment.

Next, with reference to FIG. 7, a description is given of one example of a flow of control of the air conditioner 8 based on the multi-functional peripheral 100 according to the embodiment. In FIG. 7, "START" refers to a point in time when determination of a printing document is performed. A flow chart in FIG. 7 may be implemented every time the determination is performed.

A configuration may be adopted, however, in which after an instruction is issued to the air conditioner 8 based on the flow chart in FIG. 7, until a preset second wait time has elapsed, the flow chart in FIG. 7 is not implemented even when a printing job is implemented. In other words, a configuration may be adopted in which until the second wait time has elapsed after transmission of the instruction to the air conditioner 8, the control unit 1 does not transmit a next instruction to the air conditioner 8. This can prevent a set temperature of the air conditioner 8 from being frequently switched. The second wait time is set beforehand. The storage unit 2 stores the second wait time in a non-volatile manner. For example, the second wait time is set to any length of time between several minutes and several hours. The operation panel 4 may accept setting of the second wait time. In this case, the storage unit 2 stores a thus-set value of the second wait time. The control unit 1 transmits an instruction to the air conditioner 8 after a pause of a length of time equal to or longer than the thus-set value of the second wait time.

Upon determining that a printing document is the first task document ("Yes" at Step #31), the control unit 1 controls the communication unit 6 to transmit a temperature decrease instruction toward the air conditioner 8 (the air-conditioning communication unit 84) (Step #32). The temperature decrease instruction is an instruction for decreasing a set temperature of the air conditioner 8. By decreasing a temperature in a room, drowsiness is made unlikely to occur. It is possible to control an operation of the air conditioner 8 so as to enhance efficiency of a task using the first task document.

Upon receiving the temperature decrease instruction, the air-conditioning control unit 80 decreases the set temperature (Step #33). The air-conditioning control unit 80 does not decrease the set temperature to a value lower than a settable lowest temperature. For example, when the set temperature at the time of receiving the temperature decease instruction has a value equal to the lowest temperature, the air-conditioning control unit 80 maintains the set temperature at the lowest temperature.

The control unit 1 transmits an amount of a temperature decrease that should be made (a temperature change amount) as the temperature decrease instruction. The temperature change amount is set beforehand. For example, the temperature change amount is 1 to several degrees. The storage unit 2 stores the temperature change amount in a non-volatile manner. The operation panel 4 may accept setting of the temperature change amount (a range of change in the set temperature). In this case, the storage unit 2 stores a thus-set value of the temperature change amount. The control unit 1 performs control so that the temperature decrease instruction to decrease the set temperature by the thus-set value of the temperature change amount is transmitted.

After issuance of the temperature decrease instruction, the control unit 1 continues to check whether or not a temperature maintaining period has elapsed (Step #34, "No" at Step #34→Step #34). The temperature maintaining period is a time period in which a decreased temperature in a room is maintained. The storage unit 2 stores the temperature maintaining period in a non-volatile manner. The temperature maintaining period may be set to a length of time equal to the second wait time. Furthermore, the operation panel 4 may accept setting of the temperature maintaining period. In this case, the storage unit 2 stores a thus-set value of the temperature maintaining period. The control unit 1 uses the thus-set value of the temperature maintaining period.

When the temperature maintaining period has elapsed ("Yes" at Step #34), the control unit 1 controls the communication unit 6 to transmit a temperature return instruction toward the air-conditioning communication unit 84 (Step #35). The temperature return instruction is an instruction for returning the set temperature of the air conditioner 8 to a value before issuance of the temperature decrease instruction. The temperature return instruction is an instruction for avoiding a situation where the set temperature keeps decreasing. Upon receiving the temperature return instruction, the air-conditioning control unit 80 increases (returns) the set temperature (Step #36). The control unit 1 transmits, as the temperature return instruction, an instruction to increase the set temperature by the temperature change amount. Then, this flow is ended.

Upon determining that the printing document is not the first task document ("No" at Step #31), the control unit 1 ends this flow ("END"). The control unit 1 does not communicate an instruction toward the air conditioner 8 (the air-conditioning communication unit 84). The control unit 1 does not change an operation state of the air conditioner 8.

(Periodic Adjustment of Set Temperature)

Figure 8:
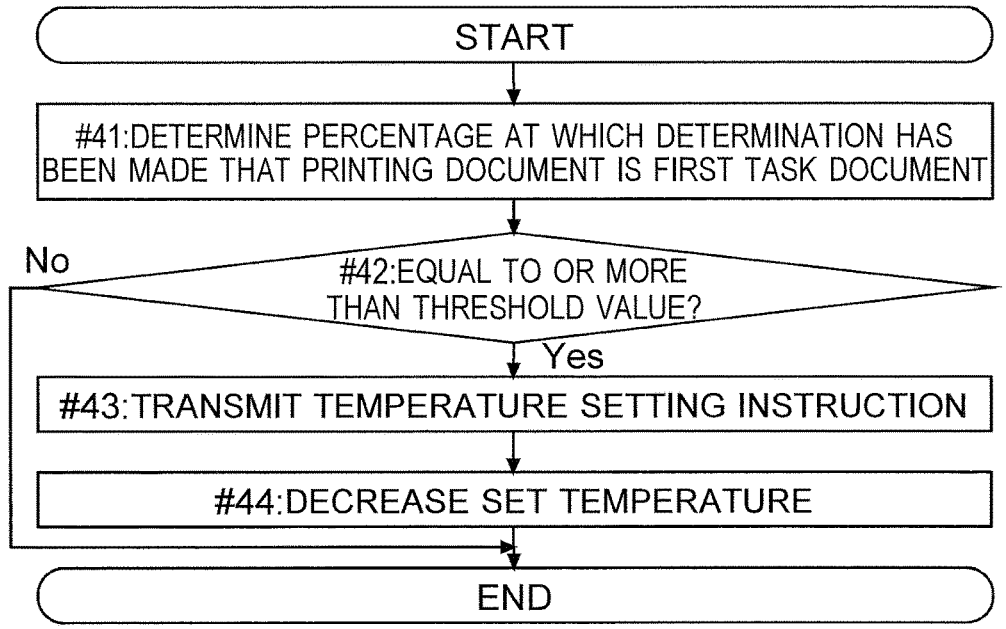
FIG. 8 is a diagram showing one example of a periodic adjustment of a set temperature performed by the multi-functional peripheral according to the embodiment.

Next, with reference to FIG. 8, a description is given of one example of a periodic adjustment of a set temperature performed by the multi-functional peripheral 100 according to the embodiment. The multi-functional peripheral 100 (the control unit 1) periodically adjusts the set temperature of the air conditioner 8. A periodic cycle for performing this adjustment is set beforehand. The storage unit 2 stores the periodic cycle in a non-volatile manner. For example, the periodic cycle is appropriately set to, for example, every three days, every five days, every week, every two weeks, or every month. The operation panel 4 may accept setting of the periodic cycle. In this case, the storage unit 2 stores a thus-set value of the periodic cycle. Furthermore, based on the thus-set value of the periodic cycle, the control unit 1 performs setting with respect to the air conditioner 8.

In FIG. 8, "START" refers to a point in time when the periodic cycle has elapsed after initial transmission of the temperature decrease instruction or after an end of a previous periodic cycle. The control unit 1 determines a percentage at which it has been determined that a printing document is the first task document (Step #41). The control unit 1 determines the percentage by dividing the number of times that it has been determined that a printing document is the first task document during the periodic cycle by the number of all printing documents printed during the periodic cycle (the number of printing jobs performed during the periodic cycle).

Next, the control unit 1 checks whether or not the percentage thus determined is equal to or more than a threshold value (Step #42). The threshold value is set beforehand. The threshold value is stored in the storage unit 2 in a non-volatile manner. For example, the threshold value is 50%. The operation panel 4 may accept setting of the threshold value. In this case, the storage unit 2 stores a thus-set value as the threshold value. Furthermore, the control unit 1 uses the thus-set value as the threshold value.

When the percentage thus determined is less than the threshold value ("No" at Step #42), the control unit 1 ends this flow ("END"). When the percentage thus determined is equal to or more than the threshold value ("Yes" at Step #42), the control unit 1 controls the communication unit 6 to transmit a temperature setting instruction toward the air conditioning communication unit 84 (Step #43). The temperature setting instruction is an instruction for decreasing the set temperature of the air conditioner 8. When it can be highly expected that a task using the first task document is to be performed, the control unit 1 reduces a temperature in a room, thus making it unlikely to cause drowsiness. It is possible to periodically control an operation of the air conditioner 8 so as to enhance efficiency of a task.

The control unit 1 transmits, to the communication unit 6, an instruction on how much the set temperature should be decreased (a temperature decrease amount) as the temperature setting instruction. For example, the control unit 1 controls the communication unit 6 to transmit an instruction to decrease the set temperature by about 1 to 2 degrees. Upon receiving the temperature setting instruction, the air-conditioning control unit 80 decreases the set temperature (Step #44). Then, the control unit 1 ends this flow ("END"). The air-conditioning control unit 80 decreases the set temperature by a temperature value thus instructed. The air-conditioning control unit 80 does not decrease the set temperature to a value lower than the sellable lowest temperature.

(Control of Door Lock Device 9)

Figure 9:
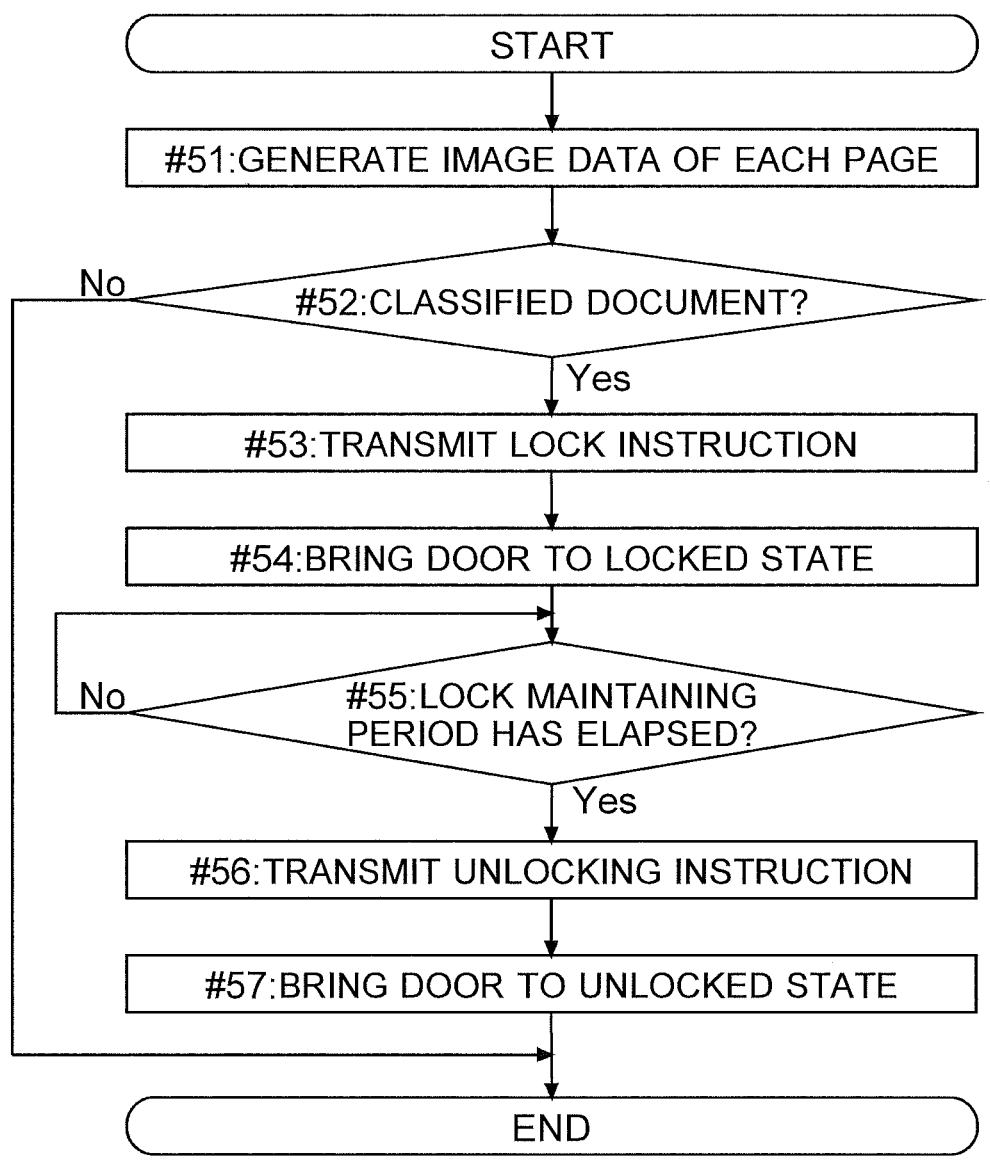
FIG. 9 is a diagram showing one example of control of the door lock device based on the multi-functional peripheral according to the embodiment.

Next, with reference to FIG. 9, a description is given of one example of control of the door lock device 9 based on the multi-functional peripheral 100 according to the embodiment. In FIG. 9, "START" refers to a point in time when a printing job is started. The printing job is, for example, a copy job or a print job. First, the control unit 1 (the image processing circuit 12) generates image data of each page to be printed in the printing job (Step #51). Then, the control unit 1 determines whether or not a document (a printing document) to be printed in the printing job is a confidential document (Step #52). In order to determine whether or not the printing document is a confidential document, the control unit 1 (the image processing circuit 12) analyzes the image data of each page to be printed in the printing job.

For example, a configuration may be adopted in which when a printing document contains a preset graphical figure, the control unit 1 determines that the printing document is a confidential document. For example, when a printing document contains a graphical figure "FOR YOUR EYES ONLY," the control unit 1 may determine that the printing document is a confidential document.

Furthermore, a confidential document may be marked with words such as, for example, "CONFIDENTIAL," "CLASSIFIED DOCUMENT," or "FOR INTERNAL USE ONLY." The storage unit 2 stores classified document term data in a non-volatile manner. The classified document term data define words with which a classified document is marked (words indicating a classified document). The control unit 1 performs OCR processing so as to recognize words contained in each page. A configuration may be adopted in which when a printing job (a printing document) contains any of the words with which a classified document is marked, the control unit 1 determines that the printing document is a classified document. When a printing job does not contain any of the words with which a classified document is marked, the control unit 1 may determine that the printing document is not a classified document.

Furthermore, a document containing personal information should be prevented from being leaked to outsiders. From this viewpoint, the control unit 1 may determine that a printing document containing personal information is a classified document. The storage unit 2 stores a list of words used in residential addresses (a residential address determination list). The residential address determination list defines names of states and cities. The control unit 1 may refer to the residential address determination list so as to check whether or not a printing document contains any residential address. Furthermore, the number of digits of phone numbers are fixed. Furthermore, first several digits of mobile phone numbers are fixed numerals. Area codes are also fixed depending on areas. The storage unit 2 stores a list of numeral strings used in phone numbers (a phone number determination list). The control unit 1 extracts a numeral string having the same number of digits as phone numbers from a printing document. The control unit 1 may compare the numeral string thus extracted with the phone number determination list so as to check whether or not the printing document contains a phone number. A configuration may be adopted in which when a printing document contains either one or both of a residential address and a phone number, the control unit 1 determines that the printing document is a classified document.

Upon determining that the printing document is not a classified document ("No" at Step #52), the control unit 1 ends this flow ("END"). The control unit 1 controls the communication unit 6 not to transmit an instruction to the door lock device 9. On the other hand, upon determining that the printing document is a classified document ("Yes" at Step #52), the control unit 1 controls the communication unit 6 to transmit a lock instruction toward the door lock device 9 (the lock communication unit 94) (Step #53). The lock instruction is an instruction for instructing the door lock device 9 to lock a door. Upon receiving the lock instruction ("Yes" at Step #53), the lock control unit 90 brings the door to a locked state (Step #54). The lock control unit 90 operates the locking mechanism 91. Thus, the door is locked with the metal lock 92. This can prevent a classified document from being taken out of a room.

After transmission of the lock instruction, the control unit 1 continues to check whether or not a lock maintaining period has elapsed ("No" at Step #55 Step #55). The lock maintaining period is a time period in which the door lock device 9 maintains the locked state. It may be inconvenient that the door needs to be unlocked at every entry into or exit from the room. As a solution to this, the control unit 1 sets a limit on a time period in which the door is kept locked. The lock maintaining period is set beforehand. The storage unit 2 stores the lock maintaining period in a non-volatile manner. The operation panel 14 may accept setting of the lock maintaining period. In this case, the control unit 1 uses a thus-set value of the lock maintaining period.

When the lock maintaining period has elapsed ("Yes" at Step #55), the control unit 1 controls the communication unit 6 to transmit an unlocking instruction toward the lock communication unit 94 (Step #56). The unlocking instruction is an instruction for bringing the door to an unlocked state. Upon receiving the unlocking instruction, the lock control unit 90 brings the door to the unlocked state (Step #57). The lock control unit 90 operates the locking mechanism 91. Thus, the door is unlocked. The control unit 1 then ends this flow ("END").

As described above, the image forming apparatus (the multi-functional peripheral 100) according to the embodiment includes the acquisition unit (the image reading unit 3, the communication unit 6), the printing unit 5, the communication unit 6, and the control unit 1. The acquisition unit acquires data to be used for printing. Based on the data acquired by the acquisition unit, the printing unit 5 performs a printing job. The communication unit 6 performs communication. Based on contents of the printing job, the control unit 1 determines whether a printing document to be printed in the printing job is the first task document or the second task document. Based on a result of the determination, the control unit 1 controls the communication unit 6 to transmit an instruction for controlling an operation of an installed device that is stationarily installed in a room. The installed device is the illumination device 7. Upon determining that the printing document is the first task document, the control unit 1 controls the communication unit 6 to transmit the first color change instruction toward the installed document. Upon determining that the printing document is the second task document, the control unit 1 controls the communication unit 6 to transmit the second color change instruction toward the installed device. The first color change instruction is an instruction for increasing a color temperature of illumination light. The second color change instruction is an instruction for decreasing a color temperature of illumination light.

With this configuration, the image forming apparatus controls the illumination device 7 in accordance with contents of a printing document. Simply by performing printing, a color (a color temperature) of interior illumination light can be changed. It is possible to estimate, based on a printing document, a task about to be performed and automatically change interior illumination so as to bring the interior illumination to a state suited for the task about to be performed. It is possible to adjust, in accordance with contents of printing to be performed, an interior environment (illumination) so as to increase efficiency and productivity of the task.

The installed device may be the air conditioner 8. Upon determining that a printing document is the first task document, the control unit 1 controls the communication unit 6 to transmit the temperature decrease instruction. The temperature decrease instruction is an instruction for decreasing the set temperature of the air conditioner 8. Thus, simply by performing printing, the set temperature of the air conditioner 8 can be automatically changed. It is possible to estimate, based on a printing document, a task about to be performed and automatically change a temperature in a room so that the temperature in the room is suited for the task about to be performed. It is possible to adjust, in accordance with contents of printing to be performed, an interior environment (air conditioning) so as to increase efficiency and productivity of the task.

When the preset temperature maintaining period has elapsed after transmission of the temperature decrease instruction, the control unit 1 controls the communication unit 6 to transmit the temperature return instruction. The temperature return instruction is an instruction for returning the set temperature that has been decreased based on the temperature decrease instruction to an original value. Thus, it is possible to return the set temperature of the air conditioner 8 that has been decreased based on the temperature decrease instruction to an original value. This can prevent the set temperature of the air conditioner 8 from being excessively decreased. It is, therefore, possible to prevent the room from being excessively cooled.

The control unit 1 determines a percentage at which it has been determined that a printing document is the first task document during a preset periodic cycle. When the percentage thus determined is equal to or more than a preset threshold value, the control unit 1 controls the communication unit 6 to transmit the temperature setting instruction for decreasing the set temperature. When a frequency of printing the first task document is high, the set temperature of the air conditioner 8 can be periodically and automatically decreased.

The installed device may be the door lock device 9 that locks and unlocks a door for entering or exiting from a room. The control unit 1 determines whether or not a printing document is a classified document. Upon determining that the printing document is a classified document, the control unit 1 controls the communication unit 6 to transmit the lock instruction. Upon determining that the printing document is not a classified document, the control unit 1 controls the communication unit 6 not to transmit the lock instruction. The lock instruction is an instruction for causing the door lock device 9 to lock the door. Thus, it is possible to lock the door so as to prevent the classified document from being taken away by a third person (a person trying to steal information). It is, therefore possible to prevent leakage of classified information.

When the preset lock maintaining period has elapsed after transmission of the lock instruction, the control unit 1 controls the communication unit 6 to transmit the unlocking instruction. The unlocking instruction is an instruction for bringing the door to an unlocked state. Thus, it is possible to automatically unlock the door. It is possible to input unlocking information based on proper classified document handling. It is possible for an authorized person to unlock the door after acquiring printed matter (a classified document).

When a printing document contains a table, the control unit 1 determines that the printing document is the first task document. When a printing document is a fixed form document conforming to a preset format, the control unit 1 determines that the printing document is the first task document. When a printing document is a written proposal, the control unit 1 determines that the printing document is the second task document. When a printing document is a presentation document, the control unit 1 determines that the printing document is a document categorized as the second task document.

Thus, a document used in a task for which it is preferable to be awakened (to make drowsiness unlikely to occur) can be determined as the first task document. For example, a document used in a task of meticulously examining contents of a document or routine work can be determined as the first task document. For example, a document containing a table or a fixed form document can be determined as the first task document. It is possible to adjust illumination and air conditioning so as to enhance efficiency of a task using the first task document.

On the other hand, a document used in a task requiring creativity (inspiration) can be determined as the second task document. For example, a document used for studying a project or a presentation can be determined as the second task document. For example, a written project or a presentation document can be determined as the second task document. It is possible to adjust illumination and air conditioning so as to enhance efficiency of a task using the second task document.

The image forming system 101 (the environment management system) includes the above-mentioned image forming apparatus (the multi-functional peripheral 100) and the illumination device 7. The illumination device 7 includes the first light source 71 and the second light source 72 having a color temperature lower than that of the first light source 71. The first color change instruction is an instruction to turn on the first light source 71. The second color change instruction is an instruction to turn on the second light source 72. Upon receiving the first color change instruction in a state where the first light source 71 is on, the illumination device 7 increases a light quantity of the first light source 71. Upon receiving the second color change instruction in a state where the second light source 72 is on, the illumination device 7 decreases a light quantity of the second light source 72. Thus, simply by performing printing, illuminance of interior illumination is increased or decreased. It is possible to estimate, based on a printing document, a task about to be performed and automatically change brightness of the interior illumination so as to establish an interior environment suited for the task about to be performed. It is possible to adjust, in accordance with contents of printing to be performed, an interior environment (brightness of illumination) so as to increase efficiency and productivity of the task.

While the foregoing has described the embodiment of the present disclosure, the scope of the present disclosure is not limited thereto. The present disclosure can be implemented by adding various modifications thereto without departing from the spirit of the disclosure.

What is claimed is:
1. An image forming apparatus, comprising:
an acquisition unit that acquires data to be used for printing;
a printing unit that performs a printing job based on the data acquired by the acquisition unit;
a communication unit that performs communication; and
a control unit that,
when starting the printing job, determines, based on contents of the printing job, whether a printing document that is a document to be printed in the printing job is a first task document or a second task document,
analyzes image data of each page in the printing job to determine when the document to be printed includes a table lamer than a prescribed size, that the document to be printed is the first task document,
analyzes image data of each page in the printing job to determine, when the document to be printed is a presentation document, that the document to be printed is the second task document when the document to be printed is a presentation document, and
based on a result of the determination, controls the communication unit to transmit an instruction for controlling an operation of an installed device that is installed in a room,
wherein
the installed device is an illumination device,
upon determining that the printing document is the first task document, the control unit controls the communication unit to transmit a first color change instruction to increase a color temperature of illumination light toward the installed device, and
upon determining that the printing document is the second task document, the control unit controls the communication unit to transmit a second color change instruction to decrease a color temperature of illumination light toward the installed device.

2. The image forming apparatus according to claim 1, wherein
the installed device is an air conditioner,
upon determining that the printing document is the first task document, the control unit controls the communication unit to transmit a temperature decrease instruction, and
the temperature decrease instruction is an instruction for decreasing a set temperature of the air conditioner.

3. The image forming apparatus according to claim 2, wherein
when a preset temperature maintaining period has elapsed after transmission of the temperature decrease instruction, the control unit controls the communication unit to transmit a temperature return instruction, and
the temperature return instruction is an instruction for returning the set temperature that has been decreased based on the temperature decrease instruction to an original value.

4. The image forming apparatus according to claim 1, wherein
the installed device is an air conditioner,
the control unit determines a percentage at which it has been determined that the printing document is the first task document during a preset periodic cycle, and
when the percentage thus determined is equal to or more than a preset threshold value, the control unit controls the communication unit to transmit a temperature setting instruction for decreasing a set temperature of the air conditioner.

5. The image forming apparatus according to claim 1, wherein
the installed device is a door lock device that locks and unlocks a door for entering or exiting from a room,
the control unit determines whether or not the printing document is a classified document,
upon determining that the printing document is the classified document, the control unit controls the communication unit to transmit a lock instruction,
upon determining that the printing document is not the classified document, the control unit controls the communication unit not to transmit the lock instruction, and
the lock instruction is an instruction for causing the door lock device to lock the door.

6. The image forming apparatus according to claim 5, wherein when a preset lock maintaining period has elapsed after transmission of the lock instruction, the control unit controls the communication unit to transmit an unlocking instruction, and the unlocking instruction is an instruction for bringing the door to an unlocked state.

7. The image forming apparatus according to claim 1, wherein the control unit determines whether or not the printing document is the first task document, upon determining that the printing document is not the first task document, the control unit determines whether or not the printing document is the second task document, upon determining that the printing document is not the second task document, the control unit recognizes that the printing document is an indeterminable document.

8. The image forming apparatus according to claim 7, wherein upon determining that the printing document is not the first task document and determining that the printing document is not the second task document, either, the control unit does not transmit an instruction to the illumination device.

9. The image forming apparatus according to claim 1, wherein when the printing document contains a table, the control unit determines that the printing document is the first task document, when the printing document is a fixed form document conforming to a preset format, the control unit determines that the printing document is the first task document, when the printing document is a written proposal, the control unit determines that the printing document is the second task document, and when the printing document is a presentation document, the control unit determines that the printing document is a document categorized as the second task document.

10. An image forming system, comprising:

the image forming apparatus according to claim 1; and an illumination device including a first light source and a second light source having a color temperature lower than that of the first light source, wherein the first color change instruction is an instruction to turn on the first light source, the second color change instruction is an instruction to turn on the second light source, upon receiving the first color change instruction in a state where the first light source is on, the illumination device increases a light quantity of the first light source, and upon receiving the second color change instruction in a state where the second light source is on, the illumination device decreases a light quantity of the second light source.

11. The image forming apparatus according to claim 1, wherein when starting the printing job, the control unit analyzes image data of each page in the printing job to determined, when the document to be printed is a fixed form document, that the document to be printed is a first task document.

12. The image forming apparatus according to claim 1, wherein when starting the printing job, the control unit analyzes image data of each page in the printing job to determined, when the document to be printed is a document used for a calculation, that the document to be printed is a first task document.

13. The image forming apparatus according to claim 1, wherein when starting the printing job, the control unit analyzes image data of each page in the printing job to determined, when the document to be printed is a written proposal, that the document to be printed is a second task document.

14. A method for controlling an image forming apparatus, comprising steps of:

acquiring data to be used for printing;

performing a printing job based on the data thus acquired;

when starting the printing job, determining, based on contents of the printing job, whether a printing document that is a document to be printed in the printing job is a first task document or a second task document;

analyzing image data of each page in the printing job to determine, when the document to be printed includes a table larger than a prescribed size, that the document to be printed is the first task document, analyzing image data of each page in the printing job to determine, when the document to be printed is a presentation document, that the document to be printed is the second task document when the document to be printed is a presentation document, using an illumination device as an installed device;

upon determining that the printing document is the first task document, transmitting a first color change instruction to increase a color temperature of illumination light to the installed device; and upon determining that the printing document is the second task document, transmitting a second color change instruction to decrease a color temperature of illumination light to the installed device.

15. The image forming apparatus according to claim 14, wherein when starting the printing job, the control unit analyzes image data of each page in the printing job to determined, when the document to be printed is a fixed form document, that the document to be printed is a first task document.

16. The image forming apparatus according to claim 14, wherein when starting the printing job, the control unit analyzes image data of each page in the printing job to determined, when the document to be printed is a document used for a calculation, that the document to be printed is a first task document.

17. The image forming apparatus according to claim 14, wherein when starting the printing job, the control unit analyzes image data of each page in the printing job to determined, when the document to be printed is a written proposal, that the document to be printed is a second task document.

* * * * *